US009882768B1

(12) United States Patent
Chen et al.

(10) Patent No.: US 9,882,768 B1
(45) Date of Patent: *Jan. 30, 2018

(54) METHODS AND APPARATUS FOR FILE SYNCHRONIZATION OVER A COMPUTER NETWORK

(75) Inventors: Jian-Ying Chen, Yi-Lan (TW); Liwei Ren, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 1420 days.

This patent is subject to a terminal disclaimer.

(21) Appl. No.: 13/419,271

(22) Filed: Mar. 13, 2012

(51) Int. Cl.
G06F 17/30 (2006.01)
H04L 29/08 (2006.01)

(52) U.S. Cl.
CPC ................ *H04L 29/0854* (2013.01)

(58) Field of Classification Search
CPC .............. H04L 29/08072; H04L 29/06; H04L 29/08549
See application file for complete search history.

(56) References Cited

U.S. PATENT DOCUMENTS

| | | | |
|---|---|---|---|
| 5,832,520 A | 11/1998 | Miller | |
| 6,233,589 B1 | 5/2001 | Balcha et al. | |
| 6,535,894 B1 | 3/2003 | Schmidt et al. | |
| 7,814,078 B1* | 10/2010 | Forman et al. | 707/698 |
| 2007/0288533 A1* | 12/2007 | Srivastava et al. | 707/203 |
| 2010/0274765 A1* | 10/2010 | Murphy et al. | 707/652 |
| 2010/0293142 A1* | 11/2010 | Ackerman et al. | 707/640 |
| 2010/0318759 A1* | 12/2010 | Hamilton et al. | 711/171 |
| 2011/0113012 A1* | 5/2011 | Gruhl et al. | 707/646 |

OTHER PUBLICATIONS

Optimizing File Replication over Limited-Bandwidth Networks using Remote Differential Compression, Teodosiu et al., Nov. 2006, Microsoft Corporation; pp. 1-16.*
Remote Differential Compression—From Wikipedia, the free encyclopedia, 1 sheet [retrieved on Feb. 24, 2012], retrieved from the internet: http://en.wikipedia.org/wiki/Remote_Differential_Compression.

(Continued)

*Primary Examiner* — Abdullahi E Salad
(74) *Attorney, Agent, or Firm* — Okamoto & Benedicto LLP

(57) ABSTRACT

A system includes a sender computer and a recipient computer. The sender computer starts the chunking process by splitting a target file into chunks and providing signatures of the chunks of the target file to the recipient computer. After and in response to receiving the signatures of the chunks of the target file, the recipient computer splits the reference file into chunks, generates signatures of the chunks of the reference file, and identifies chunks that are common between the target file and the reference file. The recipient computer combines adjacent common chunks into larger chunks and creates, for example, MD5 signatures accordingly. The sender computer receives from the recipient computer information on chunks common between the target file and the reference file and provides a sequence of edit operations to the recipient computer to allow the recipient computer to reconstruct the target file.

17 Claims, 4 Drawing Sheets

(56) References Cited

OTHER PUBLICATIONS

Roling hash—From Wikipedia, the free encyclopedia, 3 sheets [retrieved on Feb. 24, 2012], retrieved from the internet: http://en.wikipedia.org/wiki/Rolling_hash.

Rsync—From Wikipedia, the free encyclopedia, 7 sheets [retrieved on Feb. 24, 2012], retrieved from the internet: http://en.wikipedia.org/wiki/Rsync.

Dan Teodosiu, et al. "Optimizing File Replication over Limited-Bandwidth Networks using Remote Differential Compression", 2006, pp. 1-16, retrieved from the internet: ftp://ftp.research.microsoft.com/pub/tr/TR-2006-157.pdf.

\* cited by examiner

METHODS AND APPARATUS FOR FILE SYNCHRONIZATION OVER A COMPUTER NETWORK

BACKGROUND OF THE INVENTION

1. Field of the Invention

The present invention relates generally to computer file synchronization, and more particularly but not exclusively to methods and apparatus for synchronizing files over a computer network.

2. Description of the Background Art

Computer file synchronization protocols are employed in applications where the contents of two files need to be synchronized. Differential compression is a type of file synchronization protocol between a server and a client. In differential compression, the server has access to both a target file and a reference file on a single computer, and generates a difference between the target file and the reference file. The client uses the difference to reconstruct the target file from the reference file. Remote differential compression is another type of file synchronization protocol. Unlike traditional differential compression, remote differential compression does not make the assumption that all versions of a file are known. Remote differential compression generates the difference on the fly, i.e., as the protocol progresses. In remote differential compression, a sender has a copy of a target file and a recipient has a copy of a reference file. The sender and the recipient communicate over a computer network to allow the recipient to locally reconstruct the target file. RSYNC and Microsoft™ RDC protocols are examples of currently available remote differential compression protocols.

SUMMARY

In one embodiment, a method includes a sender computer splitting a target file into a plurality of chunks, generating signatures of chunks of the target file, and providing the signatures of the chunks of the target file to a recipient computer. The recipient computer receives the signatures of the chunks of the target file over a computer network, generates signatures of chunks of a reference file, compares the signatures of the chunks of the target file to the signatures of the chunks of the reference file to identify chunks that are common between the target file and the recipient file, and provides information on the chunks that are common between the target file and the recipient file to the sender computer. The sender computer uses the information on the chunks that are common between the target file and the reference file to identify chunks of the target file that are not in the reference file, creates a sequence of string edit operations to reconstruct the target file from the reference file, and sends the sequence of string edit operations to the recipient computer. The recipient computer follows the sequence of string edit operations to reconstruct the target file from the reference file.

In another embodiment, a system comprises a sender computer configured to split a target file into a plurality of chunks, to generate signatures of the chunks of the target file, to provide the signatures of the chunks of the target file to a recipient computer, and to provide the recipient computer a sequence of string edit operations to reconstruct the target file in the recipient computer. The system further comprises the recipient computer configured to split the reference file into a plurality of chunks after receiving the signatures of the chunks of the target file from the sender computer, to provide the sender computer information on chunks common between the target file and the reference file, and to reconstruct the target file using the sequence of string edit operations.

In another embodiment, a method includes splitting a target file of a sender computer into a plurality of chunks. Signatures of chunks of the target file are provided to a recipient computer over a computer network. In response to receiving the chunks of the target file in the recipient computer, a reference file is split into a plurality of chunks and signatures of chunks of the reference file are generated. Chunks common to both the target file and the reference file are identified. The target file is reconstructed from the reference file in the recipient computer based at least on the identified chunks common to both the target file and the reference file.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
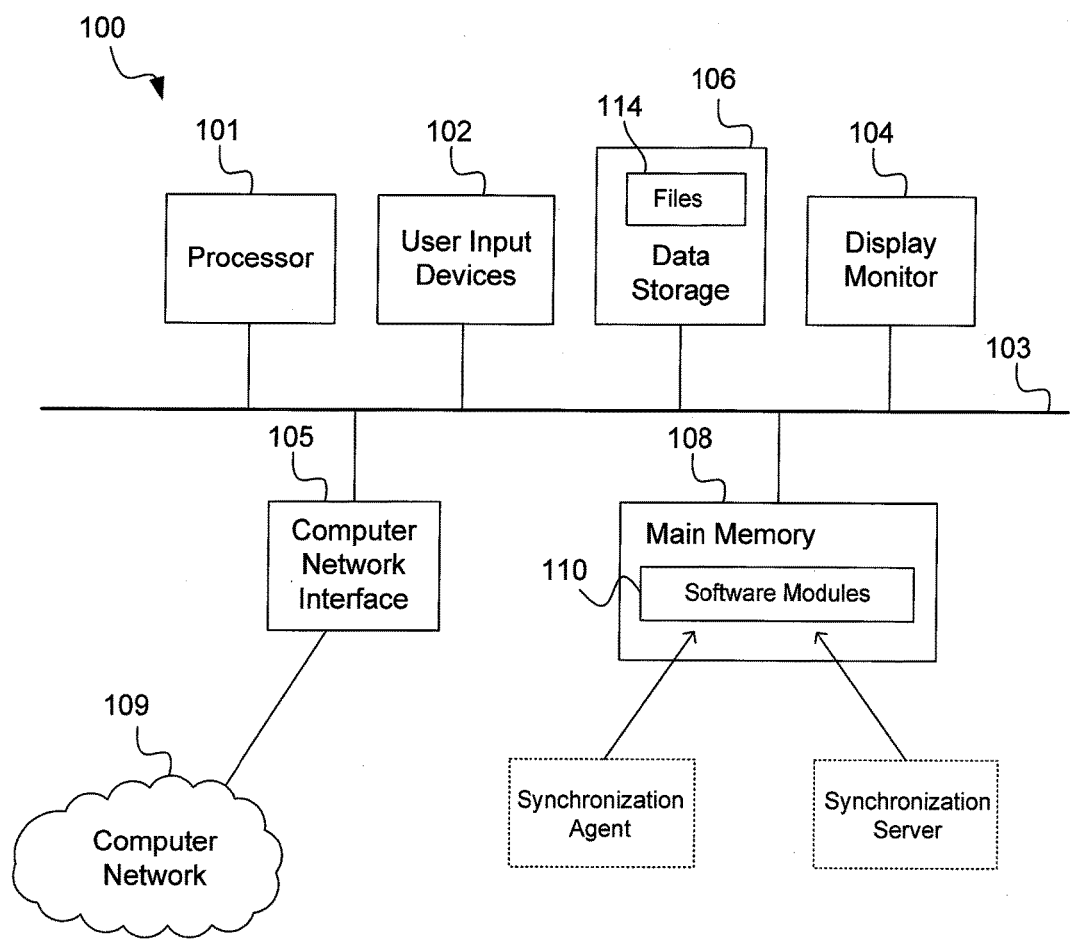
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a sender computer or a recipient computer. The computer 100 may have fewer or more components to meet the needs of a particular application. The computer 100 may include a processor 101. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, a data storage device 106 may include one or more files 114. The files 114 may include a target file when the computer 100 is configured as a sender computer, or a reference file when the computer 100 is configured as a recipient computer.

The computer 100 is a particular machine as programmed with software modules 110. The software modules 110 comprise computer-readable program code stored non-transitory in the main memory 108 for execution by the processor 101. The computer 100 may be configured to perform its functions by executing the software modules 110. The software modules 110 may be loaded from the data storage device 106 to the main memory 108. The software modules 110 may also be made available on other computer-readable storage medium including optical disk, flash drive, and other memory devices. In the example of FIG. 1, the software modules 110 may include a synchronization server in the case where the computer 100 is configured as a sender computer, or a synchronization agent in the case where the computer is configured as a recipient computer.

As will be more apparent below, embodiments of the present invention provide methods and apparatus for reconstructing a target file from a reference file. More specifically, embodiments of the present invention may generate a sequence of string edit operations to allow a recipient computer to reconstruct a target file from a reference file. In one embodiment, the sequence of string edit operations includes two types of string edit operations, namely COPY and ADD edit operations. In one embodiment, a reconstructed target file starts out empty. A COPY edit operation copies a block of data from a reference file at a well-defined address to the end of the reconstructed target file, whereas an ADD edit operation adds a block of data to the end of the reconstructed target file. These editing operations are further described with reference to FIG. 2.

Figure 2:
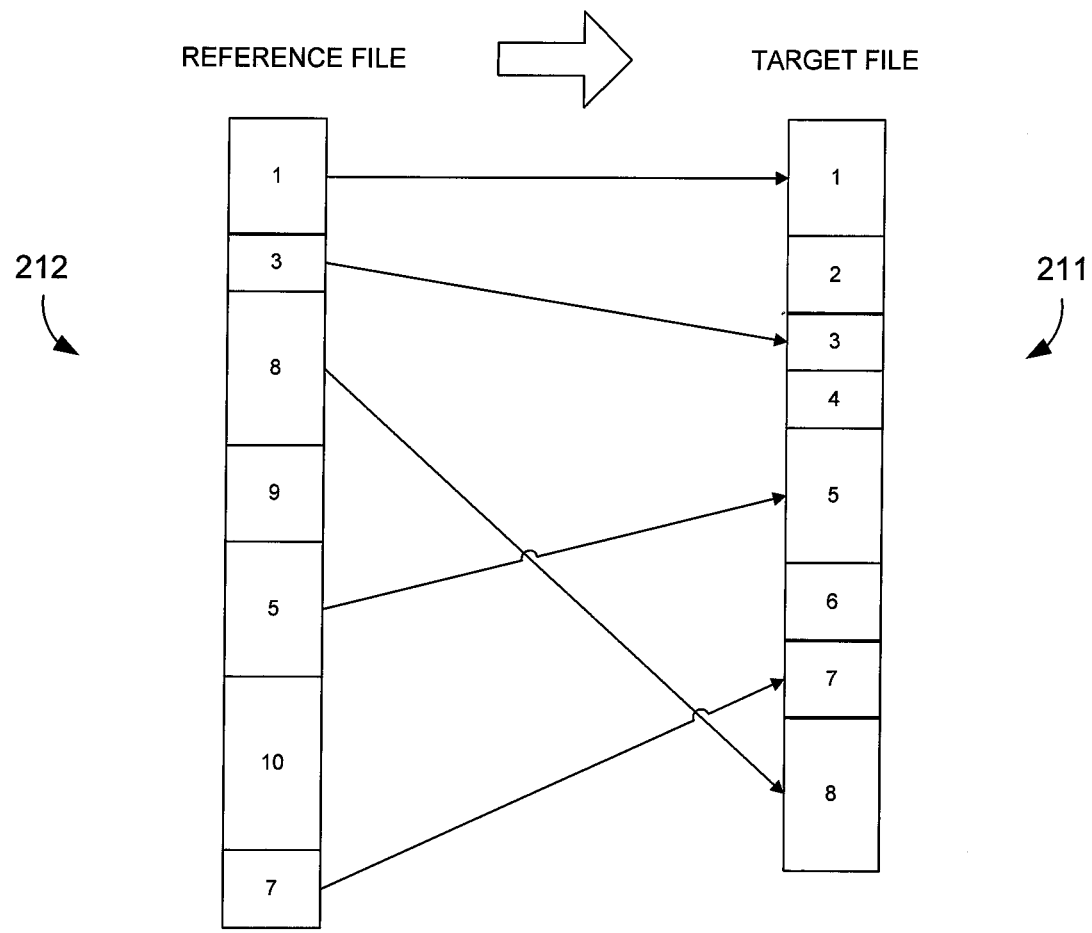
FIG. 2 schematically illustrates reconstruction of a target file from a reference file by following a sequence of string edit operations, in accordance with an embodiment of the present invention.

FIG. 2 schematically illustrates an example where a target file 211 is reconstructed from a reference file 212 by following a sequence of string edit operations in accordance with an embodiment of the present invention. In the example of FIG. 2, blocks that are similarly labeled have the same contents, i.e., the same blocks. That is, block 1 of the reference file 212 is the same as block 1 of the target file 211, block 3 of the reference file 212 is the same as block 3 of the target file 211, and so on. As a particular example, assume the block sizes in FIG. 2 are as follows:

Block 1 has 100 bytes
Block 2 has 60 bytes
Block 3 has 50 bytes
Block 4 has 50 bytes
Block 5 has 120 bytes
Block 6 has 60 bytes
Block 7 has 70 bytes
Block 8 has 150 bytes
Block 9 has 80 bytes
Block 10 has 180 bytes After identifying a sequence of string edit operations to reconstruct the target file 211 from the reference file 212, the sequence of string edit operations may be encoded in an efficient manner:

The sequence of string edit operations is formed in the order of ascending addresses of target blocks for encoding efficiency.

A COPY edit operation is encoded as <src_address, length> where src_address is the offset of the copied block within the reference file 212 and the length is the block size.

An ADD edit operation is encoded as <data, length> where data is the data block being added to the target file 211 and the length is block size.

Continuing the example of FIG. 2, the target file 211 may be reconstructed from the reference file 212 by following a sequence of eight string edit operations as follows:

1. COPY <0,100>
2. ADD <block 2,60>
3. COPY <100,50>
4. ADD <block 4,50>
5. COPY <380,120>
6. ADD <block 6,60>
7. COPY <680,70>
8. COPY <150,150>

It is to be noted that it is advantageous for an efficient differential compression algorithm to favour more COPY edit operations rather than ADD edit operations. Essentially, a differential compression algorithm may involve identifying all COPY edit operations to maximize the sum of all COPY lengths. The just described methodology can be applied to construct solutions to both problems of differential compression and remote differential compression.

Figure 3:
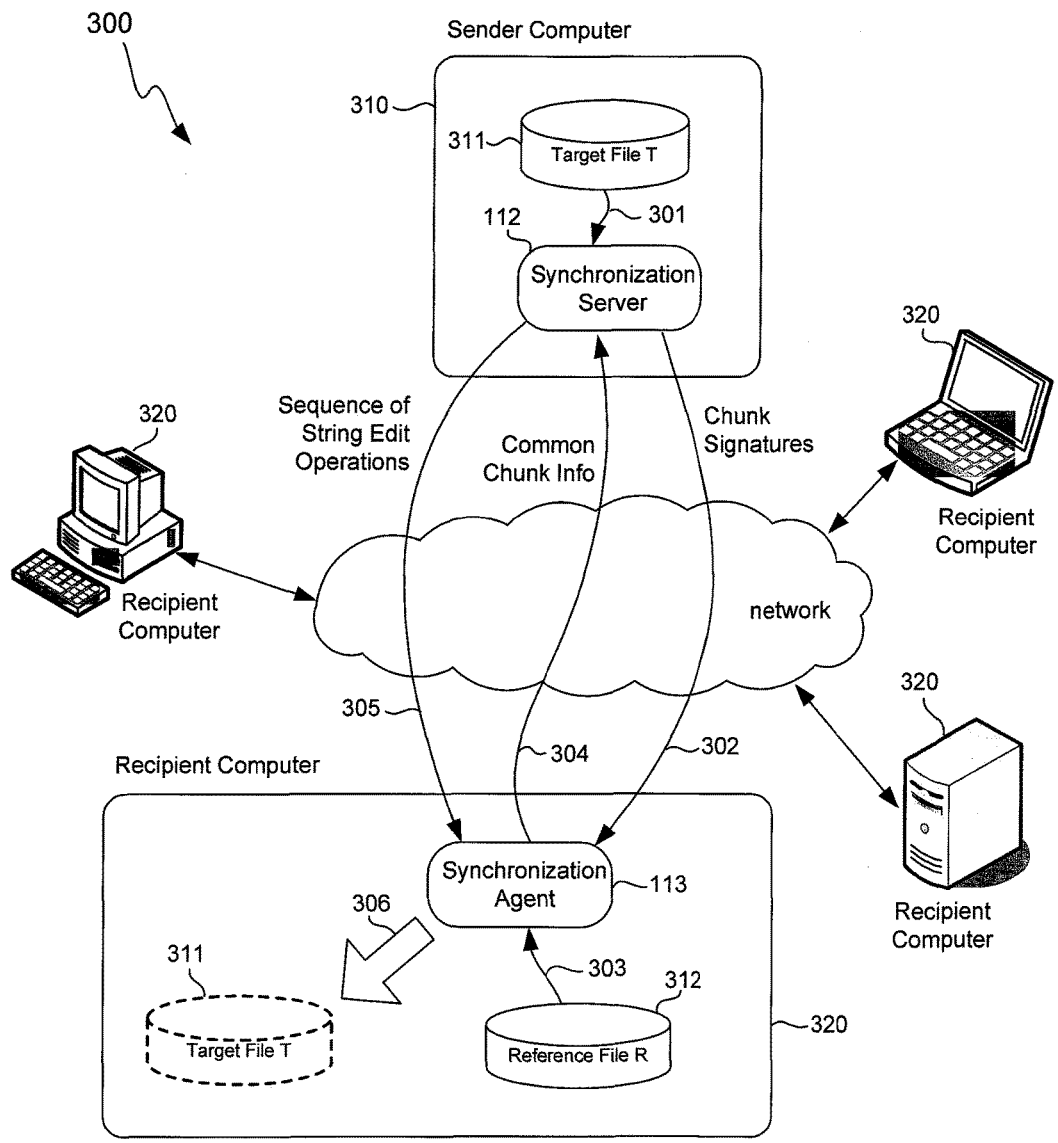
FIG. 3 shows a computer system for file synchronization over a computer network in accordance with an embodiment of the present invention.

FIG. 3 shows a computer system 300 for file synchronization over a computer network in accordance with an embodiment of the present invention. In the example of FIG. 3, the computer system 300 includes a sender computer 310 and one or more recipient computers 320. The sender computer 310 and the recipient computers 320 are separate computers that communicate over a computer network. There may be more than one sender computer 310 but only one is shown in FIG. 3 for clarity of illustration. A sender computer 310 includes a target file 311, but does not necessarily have access to a reference file 312. A recipient computer 320 includes a reference file 312 but has no access to the target file 311. The target file 311 and the reference file 312 may be different versions of the same file, with the target file 311 being the valid (e.g., most current) version. As an example, the reference file 312 may be an earlier version of the target file 311, but does not necessarily have to be any particular earlier version. In the example of FIG. 3, the recipient computers 320 would like to reconstruct the target file 311 locally. This is an example of a 1-to-many one-way file synchronization in that the target file 311 in the sender computer 310 is to be reconstructed in a plurality of recipient computers 320 (i.e., 1-to-many) and there is no need to synchronize the target file 311 itself (i.e., one-way).

In one embodiment, a synchronization server 112 comprises computer-readable program code that together with a synchronization agent 113 allows the target file 311 in the sender computer 310 to be reconstructed in a recipient computer 320. The synchronization server 112 may be configured to communicate signatures (e.g., hash values) of chunks of the target file 311 to a synchronization agent 113 of a recipient computer 320 that has a reference file 312, to receive from the synchronization agent 113 information on chunks that are common between the target file 311 and the reference file 312, and to provide the synchronization agent 113 a sequence of string edit operations to allow for reconstruction of the target file 311 in the recipient computer 320 using the reference file 312, the sequence of string edit operations being based on the information on chunks that are common between the target file 311 and the reference file 312.

In one embodiment, a synchronization agent 113 comprises computer-readable program code that together with the synchronization server 112 allows the target file 311 in the sender computer 310 to be reconstructed in a recipient computer 320. The synchronization agent 113 may be configured to receive signatures of chunks of the target file 311 from the synchronization server 112, to provide the synchronization server 112 information on chunks that are common between the target file 311 and the reference file 312, to receive from the synchronization server 112 the sequence of string edit operations, and to follow the sequence of string edit operations to reconstruct the target file 311 in the recipient computer 320 using the reference file 312.

An example operation involving reconstruction of the target file 311 of the sender computer 210 in a recipient computer 320 is now described with reference to FIG. 3. In a first procedure, the synchronization server 112 splits the target file 311 into non-overlapping chunks (arrow 301), generates a signature for each chunk of the target file 311, and then sends the signatures of the chunks of the target file 311 to the synchronization agent 113 (arrow 302). The signatures of chunks of the target file 311, rather than the raw chunks or the entirety of the target file, are sent to the recipient computer for reduced network bandwidth consumption.

Generally speaking, a chunk comprises a sequence of data. A chunk may have a fixed or variable size, referred to as a chunk length. More particularly, in the first procedure, the synchronization server 112 splits the target file 311 into N non-overlapping chunks. Each chunk has a fixed size chunk length L except the last chunk. In one embodiment, the signature of a chunk is generated using a rolling hash, which is a hash function where the input is hashed in a window that moves through the input. As a particular example, an 8-byte rolling hash may be generated from each chunk. The 8-byte rolling hash may be created using an 8-byte Adler32 hash, or a 4-byte Adler32 hash plus a 4-byte Robin-Karp hash, for example. The fixed size chunk length L may be determined by $\sqrt{8S}$, where S is the size of the target file 311. The synchronization server 112 then sends a hash list $\{<T\text{-}HASH[k]>|1 \leq k \leq N\}$ to the synchronization agent 113, where each T-HASH[k] is a rolling hash of a chunk of the target file 311.

It is to be noted that in the example of FIG. 3, the sender (instead of the recipient) starts the chunking process. This advantageously allows for better efficiency in 1-to-many one-way file synchronization compared to conventional remote differential compression protocols.

The synchronization agent 113 receives the signatures of the chunks of the target file 311 (arrow 302). In a second procedure, in response to receiving the signatures of the chunks of the target file 311, the synchronization agent 113 splits the reference file 312 into non-overlapping chunks having the same chunk length as the chunks of the target file 311 (arrow 303). It is to be noted that the synchronization agent 113 splits the reference file 312 into chunks after receiving the chunk signatures of the target file 311. This is because the chunking process is started by the synchronization server 112 in the sender computer 310 for improved efficiency. The synchronization agent 113 generates a signature for each chunk of the reference file 312 using the same hash function employed to generate the signatures of the chunks of the target file 311, and compares the signatures of the chunks of the target file 311 and the reference file 312 to identify chunks that are common between the target file 311 and the reference file 312. In one embodiment, the synchronization agent 113 combines consecutive chunks that are common to both the target file 311 and the reference file 312 into larger chunks to create a list of common chunks with variable size, i.e., with varying chunk lengths depending on the number of consecutive common chunks. The synchronization agent 113 then provides the synchronization server 112 information on chunks that are common between the target file 311 and the reference file 312, which may include the list of common chunks, the offsets of the common chunks within the reference file 312 and the target file 311, and the chunk lengths of the common chunks (arrow 304).

More particularly, in the second procedure, the synchronization agent 113 uses sliding windows that a sequence of rolling hashes $\{<R\text{-}HASH[k]>|1 \leq k \leq M\}$ can be generated adaptively from the reference file 312 with window size L, with each R-HASH[k] being a rolling hash of a chunk of the reference file 312. The synchronization agent 113 compares the list $\{<R\text{-}HASH[k]>|1 \leq k \leq M\}$ with the list $\{<T\text{-}HASH[k]>|1 \leq k \leq N\}$ to match identical chunks: if T-HASH[t]=R-HASH[s], the t-th chunk of the target file 311 and the s-th chunk of the reference file 312 are considered the same, i.e., common. Upon finding an identical chunk, the synchronization agent 113 skips L−1 steps of rolling hash calculation and advances L positions for the next chunk. The synchronization agent 113 annexes the consecutive common chunks of the target file 311 and the reference file 312 into larger chunks that results into a new list $\{<T\text{-}Chunk\text{-}Addr[k],\allowbreak R\text{-}Chunk\text{-}Addr[k],\allowbreak Chunk\text{-}Size[k]>|1 \leq k \leq Q\}$, where T-Chunk-Addr[k] is the offset of a common chunk within the target file 311, R-Chunk-Addr[k] is the offset of that common chunk within the reference file 312, and chunk-Size[k] is the chunk length of that common chunk, which may comprise consecutive common chunks combined into a single chunk.

An MD5 hash (or other hash function more expansive than a rolling hash) is then generated from each chunk of the reference file 312 that is common with the target file 311, resulting in a new list $\{<R\text{-}MD5[k],\allowbreak T\text{-}Chunk\text{-}Addr[k],\allowbreak R\text{-}Chunk\text{-}Addr[k], Chunk\text{-}Size[k]>|1 \leq k \leq Q\}$, where R-MD5[k] is an MD5 hash of a common chunk of the reference file 312. An MD5 hash is employed in this step because a rolling hash, although can be calculated relatively fast, is not as reliable. As can be appreciated, R-MD5[k] may be a single common chunk or consecutive common chunks that have been combined into one larger chunk. Accordingly, the chunks in the list R-MD5[k] may have varying chunk lengths. The synchronization agent 113 sends the list $\{<R\text{-}MD5[k], T\text{-}Chunk\text{-}Addr[k], R\text{-}Chunk\text{-}Addr[k], Chunk\text{-}Size[k]>|1 \leq k \leq Q\}$ to the synchronization server 112.

The synchronization server 112 receives from the synchronization agent 113 the information on chunks common between the target file 311 and the reference file 312 (arrow 304). In a third procedure, the synchronization server 112 uses the information on common chunks to identify chunks of the target file 311 that are not in the reference file 312. Knowing the chunks that are common to both the target file 311 and the reference file 312 and the chunks that are in the target file 311 but not in the reference file 312, the synchronization server 112 then creates a sequence of string edit operations to allow reconstruction of the target file 311 from the reference file 312. The synchronization server 112 sends the sequence of string edit operations to the synchronization agent 113 (arrow 305).

More particularly, in the third procedure, the synchronization server 112 generates an MD5 hash from each chunk of the target file 311 defined by <T-Chunk-Addr[k],Chunk-Size[k]> to create a list of T-MD5[k]. If R-MD5[k]≠T-MD5[k] for some k, the two chunks are not matched. The synchronization server 112 removes unmatched chunks from the list $\{<T\text{-}Chunk\text{-}Addr[k],\allowbreak R\text{-}Chunk\text{-}Addr[k],$ Chunk-Size[k]>|1≤k≤Q} to create an updated list of common chunks {<T-Chunk-Addr[k], R-Chunk-Addr[k], Chunk-Size[k]>|1≤k≤X}. From the list {<T-Chunk-Addr [k], Chunk-Size[k]>|1≤k≤X}, the synchronization server 112 derives all unmatched chunks of the target file 311 as a list {TU-Chunk[k]|1≤k≤G}. The synchronization server 112 then generates a sequence of COPY/ADD edit operations based on both lists {<T-Chunk-Addr[k], R-Chunk-Addr[k], Chunk-Size[k]<|1≥k≤X} and {TU-Chunk[k]|1≤k≤G}. The synchronization server 112 then sends the sequence of COPY/ADD edit operations to the synchronization agent 113.

The synchronization agent 113 receives the sequence of string edit operations from the synchronization server 112 (arrow 305). In a fourth procedure, the synchronization agent 113 then follows the sequence of string edit operations to reconstruct the target file 311 from the reference file 312 in the recipient computer 320. More particularly, in the fourth procedure, the synchronization agent 113 performs a sequence of COPY and ADD edit operations to reconstruct the target file 311 from the reference file 312, by copying common chunks from the reference file 312 to the reconstructed target file and adding unmatched chunks to the reconstructed target file.

As can be appreciated, the synchronization server 112 may also synchronize the target file 311 with reference files 312 of other recipient computers 320 by sending the chunks of the target file 311 to those recipient computers 320.

Figure 4:
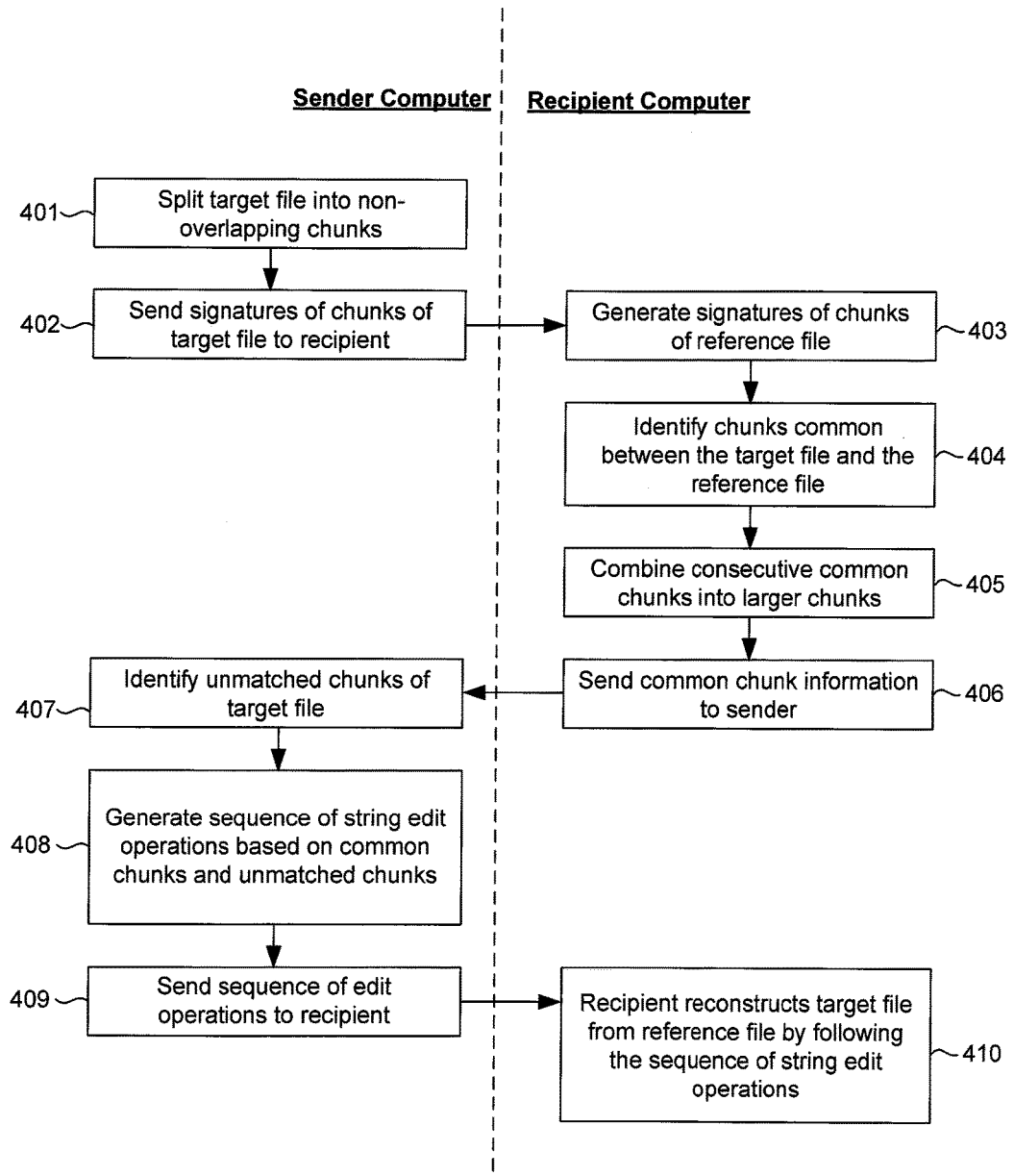
FIG. 4 shows a flow diagram of a method of synchronizing files over a computer network in accordance with an embodiment of the present invention.

Referring now to FIG. 4, there is shown a flow diagram of a method of synchronizing files over a computer network in accordance with an embodiment of the present invention. The method is explained using the components of the system 300 for illustration purposes only. In the example of FIG. 4, the steps performed by the sender computer 310 is on the left side of the figure (i.e., steps 401, 402, and 407-409) and the steps performed by the recipient computer 320 is on the right side of the figure (i.e., steps 403-406 and 410). The sender computer 310 may perform its steps with the actions of the synchronization server 112, and the recipient computer 320 may perform its steps with the actions of the synchronization agent 113.

In the example of FIG. 4, the sender computer 310 starts the chunking process by splitting the target file 311 into a plurality of non-overlapping chunks (step 401). The sender computer 310 generates first signatures of the chunks of the target file 311, e.g., using a rolling hash function, and then sends the first signatures of the chunks of the target file 311 to the recipient computer 320 (step 402).

In response to receiving the first signatures of the chunks of the target file 311, the recipient computer 320 splits the reference file 312 into non-overlapping chunks and generates first signatures of chunks of the reference file 312 (step 403). In one embodiment, the recipient computer 320 splits the reference file 312 after and in response to receiving the first signatures of chunks of the target file 311 because the chunking process is started by the sender, which is the sender computer 310 in this example. The recipient computer 320 compares the first signatures of the chunks of the target file 311 to the first signatures of the chunks of the reference file 312 to identify chunks that are common between the target file 311 and the reference file 312 (step 404).

The recipient computer 320 combines consecutive common chunks into larger chunks (step 405). This advantageously reduces network bandwidth consumption. For example, if a chunk and an immediately next following chunk are common in both the target file 311 and the reference file 312, the chunk and the immediately next following chunk may be combined into one large chunk having a longer chunk length, which in this case is 2L assuming the chunk and the immediately next following chunk each has a chunk length L. The common chunks may be included in a list of common chunks and indicated in a list that includes offset addresses where the common chunks may be found within the reference file 312 and the target file 311, and the chunk length of the common chunks. The recipient computer 320 may obtain a copy of the common chunks from the reference file 312, and generate second signatures of these chunks using a hash function (which is MD5 instead of rolling hash in this example) to generate a list of common chunks. The chunks in the list of common chunks may have different chunk lengths because of the combination of successive common chunks into larger chunks. The recipient computer 320 sends the sender computer 310 information on the common chunks, which includes the list of common chunks, offset addresses of the common chunks, and chunk lengths of the common chunks (step 406).

The sender computer 310 receives the information on the common chunks from the recipient computer 320, and uses the information on the common chunks to identify unmatched chunks of the target file 311 (step 407). For example, the sender computer 310 may generate second signatures (which comprise MD5 hashes instead of rolling hashes in this example) for the chunks of the target file 311 identified in the list of common chunks as being common with chunks of the reference file 312 to generate a list of common chunks of the target file 311. The chunks in the list of common chunks of target file 311 may have different chunk lengths to conform to the chunk lengths indicated by the information on the common chunks. The sender computer 310 compares the list of common chunks received from the recipient computer 310 with the list of common chunks of the target file 311 generated by the sender computer 310 to identify chunks of the target file 311 that are unmatched, i.e., not present, in the reference file 312. The sender computer 310 removes the unmatched chunks of the target file 311 from the list of common chunks, creating an updated list of common chunks. The sender computer 310 may then generate a sequence of string edit operations to reconstruct the target file 311 from the reference file 312 based on information on the chunks common to both the reference file 312 and the target file 311 and information on chunks that are in the target file 311 but not in the reference file 312 (step 408). The sender computer 310 sends the sequence of string edit operations to the recipient computer 320 (step 409).

The recipient computer 320 receives the sequence of string edit operations, and follows the sequence of string edit operations to locally reconstruct the target file 211 from the reference file 312 (step 410). The sequence of string edit operations may include edit operations to copy common chunks from the reference file 211 to the reconstructed target file and edit operations to add unmatched chunks (i.e., chunks in the target file 311 but not in the reference file 312) to the reconstructed target file.

The efficiency of the above-described methods and apparatus for file synchronization, referred to below as "Trend Remote Differential Compression" (TRDC), may be compared to conventional remote differential compression protocols, such as RSYNC.

A first use case involves having a reference file. q bytes are inserted and deleted at one spot in the reference file to get a new target file. q is small compared to a chunk length L.

Assume the file size of the target file is S, the target file is split into chunks with a chunk length L at a step 1 below:
- Step 1: The sender needs to send around 8S/L bytes to the recipient because each signature is 8 bytes long.
- Step 2: There may be at most two annexed common chunks. What recipient sends to the sender is at most 56 bytes, so it is ignored.
- Step 3: There are one ADD edit operation and at most two COPY edit operations. The two COPY edit operations can be ignored. The one ADD edit operation costs L bytes.

Total cost is approximately $C(L)=8S/L+L$. When $8S/L=L$, i.e., $L=\sqrt{8S}$ as the optimal chunk length, the cost is the smallest, i.e., $2\sqrt{8S}$.

Using similar analysis, for the RSYNC protocol, $C(L)=24S/L+L$. The optimal chunk length for RSYNC is $\sqrt{24S}$ to achieve the smallest cost $2\sqrt{24S}$.

A second use case involves having a reference file. A sequence of Q bytes is inserted/deleted only at m spots in the reference file to get a new target file. Assuming Q is much less than the chunk length L gives the following estimates:
- With $L=\sqrt{8S}$, the total cost for TRDC will be approximately $(m+1)*\sqrt{8S}$.
- With $L=\sqrt{24S}$, the total cost for the RSYNC will be approximately $(m+1)*\sqrt{24S}$.

The above first and second use cases show that TRDC allows for more efficient file synchronization compared to RSYNC.

In the following data experiments, five sets of files with different sizes are employed. The results of the experiments are shown in TABLES 1 and 2 below. TABLE 1 shows the results of an experiment involving typical use cases (moderate changes in multiple positions), while TABLE 2 shows the results of an experiment involving best use cases (small change at only one position). The results of the experiments indicate that compared to RSYNC, TRDC allows for bandwidth reduction that may be as high as 78% in certain cases.

TABLE 1

Typical use cases (Moderate changes in multiple positions)

| Sample File Sizes (MB) | RSYNC Bandwidth Cost (Bytes) | TRDC Bandwidth Cost (Bytes) | Bandwidth Reduction |
|---|---|---|---|
| 1 MB | 21867 | 15232 | 30% |
| 2 MB | 35143 | 20427 | 42% |
| 4 MB | 67811 | 38945 | 43% |
| 8 MB | 83339 | 61320 | 26% |
| 16 MB | 118341 | 67712 | 43% |

TABLE 2

Best use cases (small change at only one position)

| Sample File Sizes (MB) | RSYNC Bandwidth Cost | TRDC Bandwidth Cost | Bandwidth Reduction |
|---|---|---|---|
| 1 MB | 9211 | 3632 | 61% |
| 2 MB | 12338 | 4409 | 64% |
| 4 MB | 20012 | 6022 | 70% |
| 8 MB | 34768 | 8718 | 75% |
| 16 MB | 52023 | 11478 | 78% |

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method comprising:
    a sender computer splitting a target file into a plurality of chunks, generating first signatures of chunks of the target file, and providing the first signatures of the chunks of the target file to a recipient computer;
    the recipient computer receiving the first signatures of the chunks of the target file over a computer network, generating first signatures of chunks of a reference file, comparing the first signatures of the chunks of the target file to the first signatures of the chunks of the reference file to identify chunks that are common between the target file and the reference file, and providing information on the chunks that are common between the target file and the reference file to the sender computer;
    the sender computer using the information on the chunks that are common between the target file and the reference file to identify chunks of the target file that are not in the reference file, creating a sequence of string edit operations to reconstruct the target file from the reference file, and sending the sequence of string edit operations to the recipient computer; and
    the recipient computer following the sequence of string edit operations to reconstruct the target file from the reference file.

2. The method of claim 1 further comprising:
    the recipient computer combining successive chunks that are common between the target file and the reference file into a single chunk having a chunk length that is longer than a chunk length of the chunks of the target file provided by the sender computer to the recipient computer.

3. The method of claim 1 wherein the information on the chunks that are common between the target file and the reference file provided by the recipient computer to the sender computer includes second signatures of chunks of the reference file that are common with chunks of the target file.

4. The method of claim 3 further comprising:
    the sender computer generating second signatures of chunks of the target file that are common with chunks of the reference file, and comparing the second signatures of chunks of the target file that are common with chunks of the reference file to the second signatures of chunks of the reference file that are common with chunks of the target file to identify chunks of the target file that are not in the reference file.

5. The method of claim 4 wherein the first signatures of the chunks of the target file comprise hash values of a first hash function and the second signatures of chunks of the target file that are common with chunks of the reference file comprise hash values of a second hash function different from the first hash function.

6. The method of claim 5 wherein the first hash function is a rolling hash function.

7. The method of claim 5 wherein the first hash function is a rolling hash function and the second hash function is an MD5 hash function.

8. A system comprising:
    a sender computer comprising a processor and memory, the sender computer being configured to split a target file into a plurality of chunks, to generate signatures of the chunks of the target file, to provide the signatures of the chunks of the target file to a recipient computer, and to provide the recipient computer a sequence of string edit operations to reconstruct the target file in the recipient computer; and the recipient computer comprising a processor and memory, the sender computer being configured to split the reference file into a plurality of chunks after receiving the first signatures of the chunks of the target file from the sender computer, to provide the sender computer information on chunks common between the target file and the reference file, and to reconstruct the target file using the sequence of string edit operations, wherein the sequence of string edit operations comprises an edit operation to copy a chunk of the reference file into a reconstructed target file in the recipient computer and an edit operation to add a chunk that is in the target file but not in the reference file into the reconstructed target file.

9. The system of claim 8 wherein the recipient computer is configured to combine chunks common between the target file and the reference file into a chunk having a chunk length longer than a chunk length of chunks of the target file.

10. The system of claim 8 wherein the sender computer generates the signatures of the chunks of the target file using a rolling hash function.

11. The system of claim 8 wherein the recipient computer is configured to generate signatures of chunks of the reference file and to compare the signatures of the chunks of the reference file to the signatures of the chunks of the target file to identify chunks common between the target file and the reference file.

12. The system of claim 8 further comprising:

another recipient computer configured to receive another sequence of string edit operations from the sender computer to reconstruct the target file locally in the other recipient computer.

13. A method comprising:

splitting a target file of a sender computer into a plurality of chunks;

providing signatures of chunks of the target file to a recipient computer over a computer network;

in response to receiving the signatures of the chunks of the target file in the recipient computer, splitting a reference file into a plurality of chunks and generating signatures of chunks of the reference file;

identifying chunks common to both the target file and the reference file; and reconstructing the target file from the reference file in the recipient computer based at least on the identified chunks common to both the target file and the reference file, wherein reconstructing the target file from the reference file in the recipient computer comprises receiving a sequence of string edit operations in the recipient computer and following the sequence of string edit operations to reconstruct the target file from the reference file in the recipient computer, wherein the sequence of string edit operations includes an edit operation to copy a chunk of the reference file into a reconstructed target file in the recipient computer and an edit operation to add a chunk present in the target file but not in the reference file into the reconstructed target file.

14. The method of claim 13 further comprising:

combining consecutive chunks common to both the target file and the reference file into another chunk having a chunk length longer than a chunk length of chunks of the target file.

15. The method of claim 13 wherein the signatures of the chunks of the target file are hash values.

16. The method of claim 15 wherein the hash values are rolling hash values.

17. The method of claim 13 further comprising:

comparing the signatures of the chunks of the target file to the signatures of the chunks of the reference file to identify chunks common to both the target file and the reference file.

* * * * *